US009532280B2

(12) United States Patent
Monteiro da Silva et al.

(10) Patent No.: US 9,532,280 B2
(45) Date of Patent: Dec. 27, 2016

(54) ELECTRONIC SYSTEM WITH SEARCH MECHANISM AND METHOD OF OPERATION THEREOF

(71) Applicant: Samsung Electronics Co., Ltd., Suwon-si, Gyeonggi-Do (KR)

(72) Inventors: Claudio Rafael Cunha Monteiro da Silva, San Diego, CA (US); Tiangao Gou, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/520,003

(22) Filed: Oct. 21, 2014

(65) Prior Publication Data
US 2015/0126194 A1 May 7, 2015

Related U.S. Application Data

(60) Provisional application No. 61/900,230, filed on Nov. 5, 2013.

(51) Int. Cl.
H04W 36/00 (2009.01)
H04B 7/06 (2006.01)
H04W 36/18 (2009.01)

(52) U.S. Cl.
CPC ....... *H04W 36/0083* (2013.01); *H04B 7/0617* (2013.01); *H04W 36/18* (2013.01)

(58) Field of Classification Search
CPC .............................. H04B 7/0617; H04W 36/34

USPC ........................................................ 455/436
See application file for complete search history.

(56) References Cited

U.S. PATENT DOCUMENTS

| 8,675,763 | B2* | 3/2014 | Lindgren | H04B 7/0417 375/267 |
| 2002/0137538 | A1* | 9/2002 | Chen | H04B 7/0491 455/575.7 |
| 2004/0106412 | A1* | 6/2004 | Laroia | H04W 16/12 455/448 |
| 2004/0152458 | A1* | 8/2004 | Hottinen | H04W 88/06 455/423 |
| 2013/0121185 | A1 | 5/2013 | Li et al. | |
| 2013/0223251 | A1 | 8/2013 | Li et al. | |
| 2014/0274056 | A1* | 9/2014 | Hyde | H04W 76/02 455/436 |

OTHER PUBLICATIONS

Tzeng et al., "A CMOS Code-Modulated Path-Sharing Multi-Antenna Receiver Front-End", IEEE Journal of Solid-State Circuits, vol. 44 No. 5, May 2009, p. 1321.

* cited by examiner

*Primary Examiner* — Michael Neff
(74) *Attorney, Agent, or Firm* — IP Investment Law Group

(57) ABSTRACT

An electronic system includes: a communication channel configured to connect a first device to a second device; a search channel configured to search for a third device in parallel to the communication channel connected to the first device and the second device; and a communication unit configured to handover the communication channel to connect the first device and the third device without the second device.

20 Claims, 9 Drawing Sheets

ELECTRONIC SYSTEM WITH SEARCH MECHANISM AND METHOD OF OPERATION THEREOF

CROSS-REFERENCE TO RELATED APPLICATION(S)

This application claims the benefit of U.S. Provisional Patent Application Ser. No. 61/900,230 filed Nov. 5, 2013, and the subject matter thereof is incorporated herein by reference thereto.

TECHNICAL FIELD

An embodiment of the present invention relates generally to an electronic system, and more particularly to a system for searching.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of hindrances or interferences from numerous sources, as well as computational complexities rising from numerous possible formats and bandwidths for communicated information, which affect the quality and speed of the accessible data.

Thus, a need still remains for a computing system with searching mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: a communication channel configured to connect a first device to a second device; a search channel configured to search for a third device in parallel to the communication channel connected to the first device and the second device; and a communication unit configured to handover the communication channel to connect the first device and the third device without the second device.

An embodiment of the present invention provides a method of operation of an electronic system including: connecting a first device to a communication channel configured to connect to a second device; searching with a search channel configured to search for a third device in parallel to the communication channel connected to the first device and the second device; and implementing a handover process with a communication unit configured to handover the communication channel to connect the first device and the third device without the second device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
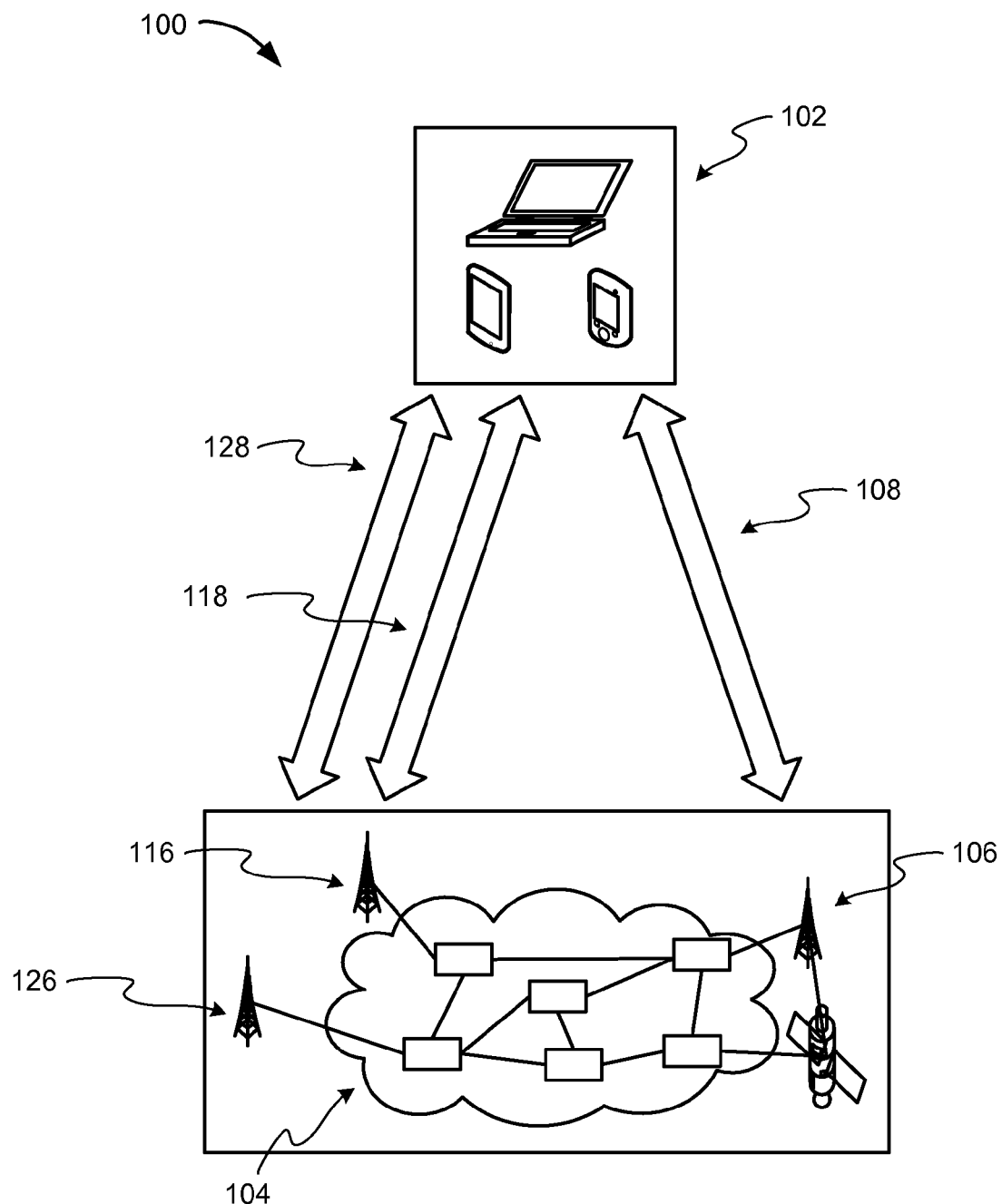
FIG. 1 is an electronic system with control mechanism in an embodiment of the invention.

The following embodiments of the present invention can use millimeter-wave radios with likely more than one radio frequency (RF) chain driving, powering, exciting, stimulating, connected to, or combination thereof, an antenna array. The following embodiments can include a process that increases the reliability and reduces the latency of the handover process in millimeter-wave cellular systems such as systems that use a 3-300 GHz spectrum. The following embodiments of the invention can include different RF chains of a terminal that, depending on operating conditions, can be divided into two groups.

Thus, at least two different beams could be formed simultaneously or in parallel by an array of antennas: At least one beam can be in an optimal direction of the serving base station and another can be continuously rotating in search of potential new base stations in order to enable handover. The search for potential new base stations and data transmission/reception with the current base station are preferably performed simultaneously or in parallel.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or combination thereof in an embodiment of the invention in accordance with the context in which the term is used. For example, the software can be machine code, firmware, embedded code, application software, or combination thereof. The software can also include a function, a call to a function, a code block, or combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or combination thereof. Further, if a module is written in the apparatus claims section below, the modules are deemed to include hardware circuitry for the purposes and the scope of apparatus claims.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown an electronic system 100 with control mechanism in an embodiment of the invention. The electronic system 100 includes a first device 102, such as a mobile device, a cellular phone, a notebook computer, user equipment (UE), or combination thereof, connected to a network 104. The network 104 is a system of wired or wireless communication devices or means that are connected to each other for enabling communication between devices.

In an embodiment of the invention an antenna array, such as a phased array, can be driven by a number of radio frequency (RF) chains to enable handover by creating two different beams, one beam for communication with the current serving base station and a second beam that is continuously rotating in search of potential new base stations. In the present invention, both the "data transmission mode" (transmission and reception of data, control, and reference signals with the serving base station) and the "search mode" (transmission and reception of beamforming acquisition and training signals in order to search for other potential base stations that could serve the terminal) can be performed simultaneously or in parallel.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The electronic system 100 can include a second device 106 for directly or indirectly linking and communicating with the first device 102. The network 104 can include the second device 106. The second device 106 can receive signals from the first device 102, transmit signals to the first device 102, process signals, or combination thereof. The second device 106 can also relay signals between other base stations, components within the network 104, or combination thereof.

The first device 102 can be connected to the network 104 through the second device 106. For example, the second device 106 can be a base station (BS), a router, a modem, or combination thereof. Also for example, the second device 106 can be a communication device or a processing component included in or included with a cell tower, a wireless router, an antenna, or combination thereof, being used to communicate with the first device 102, such as by sending signals to or receiving signals from.

The first device 102 can connect to and communicate with other devices, such as other mobile devices, servers, computers, telephones, another of the first device 102, or combination thereof. For example, the first device 102 can communicate with other devices by transmitting signals, receiving signals, processing signals, or combination thereof and displaying a content of the signals, audibly recreating sounds according to the content of the signals, processing according to the content, such as storing an application or updating an operating system, or combination thereof.

The second device 106 can be used to wirelessly exchange, transmit, decode, or combination thereof, signals for communication, including voice signals of a telephone call or data representing a webpage and interactions therewith. The second device 106 can also transmit reference signals, training signals, error detection signals, error correction signals, header information, transmission format, protocol information, or combination thereof.

Based on the communication method, such as Time Division Duplex (TDD), Frequency Division Duplex (FDD), code division multiple access (CDMA), orthogonal frequency-division multiple access (OFDMA), Third Generation Partnership Project (3GPP), Long Term Evolution (LTE), fourth generation (4G) standards, or combination thereof, the communication signals can include a reference portion, a header portion, a format portion, an error correction or detection portion, or combination thereof imbedded in the communicated information.

The reference portion, header portion, format portion, error correction, detection portion, or combination thereof can include a predetermined bit, pulse, wave, symbol, or combination thereof. The various portions can be embedded within the communicated signals at regular time intervals, frequency, code, or combination thereof.

In other embodiments, the network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the network 104. Ethernet, digital subscriber line (DSL), fiber to the home (FTTH), and plain old telephone service (POTS) are examples of wired communication that can be included in the network 104.

Further, the network 104 can traverse a number of network topologies and distances. For example, the network 104 can include direct connection, personal area network (PAN), local area network (LAN), metropolitan area network (MAN), wide area network (WAN), or combination thereof.

In an embodiment of the invention, the first device 102 can be connected to the second device 106 with a communication channel 108 such as a signal, a beam, an electronic transmission, or combination thereof. In a manner similar to the second device 106, the first device 102 can be connected to a third device 116 with a first search channel 118 such as a signal, a beam, an electronic transmission, or combination thereof. Similarly, the first device 102 can be connected to a fourth device 126 with a second search channel 128 such as a signal, a beam, or combination thereof. The third device 116 and the fourth device 126 can be a communication device or a processing component included in or included with a cell tower, a wireless router, an antenna, or combination thereof, being used to communicate with the first device 102, such as by sending signals to or receiving signals from.

For example, the first device 102 can be connected through the communication channel 108 and the second device 106, the third device 116, the fourth device 126, or combination thereof, to the network 104 for communication such as transmitted signals, received signals, transmitted data, received data, or combination thereof. Also, the first device 102 can be connected with the first search channel 118 and the third device 116 to the network 104 for a search, such as determining direction and signal strength of the third device 116. Further, the first device 102 can be connected with the second search channel 128 and the fourth device 126 to the network 104 for a search, such as determining direction and signal strength of the fourth device 126.

In a manner similar to the communication channel 108, the first search channel 118, the second search channel 128, or combination thereof, can include transmitted signals, received signals, transmitted data, received data, or combination thereof. The first search channel 118, the second search channel 128, or combination thereof, can provide transmitted signals, received signals, transmitted data, received data, or combination thereof, for determining direction and signal strength of other devices including the second device 106, the third device 116, the fourth device 126, other devices, or combination thereof.

For illustrative purposes, the first device 102 is shown connected through the communication channel 108 to the second device 106 although it is understood that the first device 102 can also be connected through the communication channel 108 to the third device 116, the fourth device 126, or combination thereof. The first device 102 can identify that all resources such as RF chains are not needed to maintain the communication channel 108 with the second device 106, thus resources can be used for the first search channel 118, the second search channel 128, or combination thereof.

In an embodiment of the invention, the first device 102 can handover the communication channel 108 such as connecting the first device 102 and the third device 116, the fourth device 126, or combination thereof, with the communication channel 108 based on comparing, measuring, or combination thereof, the direction and the signal strength of the third device 116, the fourth device 126, or combination thereof, with the second device 106. For example, the handover of the communication channel 108 can connect the first device 102 and the third device 116, the fourth device 126, or combination thereof, without the second device 106 connected.

For illustrative purposes, the first device 102 is shown connected to the second device 106, the third device 116, and the fourth device 144, although it is understood that the first device 102 can be connected to any number or type of device. For example, the first device 102 can be connected to more than four devices.

Also for illustrative purposes, the first device 102 is shown connected with the communication channel 108, the first search channel 118 and the second search channel 128 although it is understood that the first device 102 may be connected to any number or type of channel. For example, the first search channel 118 and the second search channel 128 may be a same channel at different times, positions, or combination thereof.

It has been discovered that the electronic system 100 with the first device 102 provide connections with more than one channel, such as the communication channel 108, the first search channel 118, the second search channel 128, or combination thereof. The first device 102 can identify that all resources such as RF chains are not needed to maintain the communication channel 108, thus resources can be used for the first search channel 118, the second search channel 128, connection with the third device 116, connection with the fourth device 126, or combination thereof. Alternatively, the first device 102 can identify that all resources such as RF chains are needed to maintain the communication channel 108 and no additional search channels or connections will be initiated. The connections with more than one channel include different functions such as communication, search, or combination thereof.

It has also been discovered that the electronic system 100 with the first device 102 provides connections with more than one device such as the second device, 106, the third device 116, the fourth device 126, or combination thereof. The first device 102 can identify that all resources such as RF chains are not needed to maintain connection with the second device 106, thus connections can be made with the third device 116, the fourth device 126, or combination thereof. The connections include transmit, receive, direction, signal strength, time, position, or combination thereof.

It has further been discovered that the electronic system 100 with an antenna array, such as a phased array, being driven by a number, such as more than one, of a radio frequency (RF) chain enables handover by creating two different beams, one for communication with the current serving base station and a second one that is continuously rotating in search of potential new base stations. This process of dividing available RF chains into two or more groups, such as at least one to maintain the communication channel 108 and at least one to establish a search channel, can be performed whenever the first device 102 does not need all available RF chains to maintain the communication channel 108. If possible, performing the "data transmission mode" and the "search mode" in parallel, allows mobile users to efficiently maintain their connection to the network while searching for other potential base stations.

Figure 2:
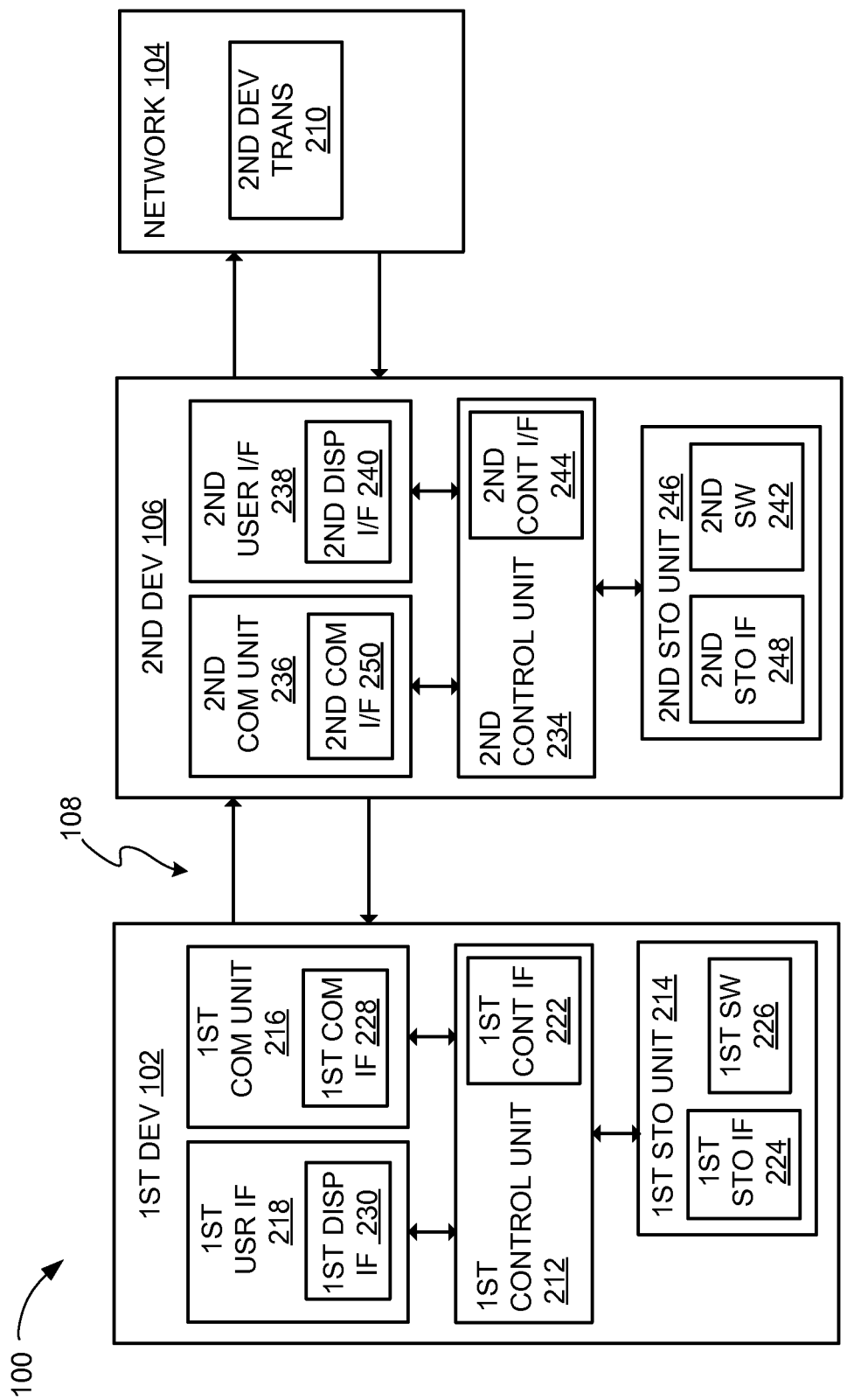
FIG. 2 is an exemplary block diagram of the electronic system in an embodiment of the invention.

Referring now to FIG. 2, therein is shown an exemplary block diagram of the electronic system 100 in an embodiment of the invention. The electronic system 100 can include the first device 102, the network 104, and the second device 106. The first device 102 can send information in the communication channel 108 to the second device 106 for the network 104. The second device 106 can send information in a second device transmission 210 from the network 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the invention, the first device 102 will be described as a client device and the second device 106 will be described as a server device. The embodiment of the invention is not limited to this selection for the type of devices. The selection is an example of an embodiment of the invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the electronic system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or combination thereof.

The first storage unit 214 can store the first software 226. The first storage unit 214 can also store the relevant information, such as data representing incoming images, data representing previously presented image, sound files, or combination thereof.

The first storage unit 214 can be a volatile memory, a nonvolatile memory, an internal memory, an external memory, or combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106 of FIG. 1, an attachment, such as a peripheral device or a computer desktop, and the network 104.

The first communication unit 216 can also function as a communication hub allowing the first device 102 to function as part of the network 104 and not limited to be an end point or terminal unit to the network 104. The first communication unit 216 can include active and passive components, such as microelectronics, an antenna, or combination thereof, for interaction with the network 104.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the electronic system 100. The first control unit 212 can also execute the first software 226 for the other functions of the electronic system 100. The first control unit 212 can further execute the first software 226 for interaction with the network 104 via the first communication unit 216.

The second device 106 can be optimized for implementing an embodiment of the invention in a multiple device embodiment with the first device 102. The second device 106 can provide the additional or higher performance processing power compared to the first device 102. The second device 106 can include a second control unit 234, a second communication unit 236, and a second user interface 238.

The second user interface 238 allows a user (not shown) to interface and interact with the second device 106. The second user interface 238 can include an input device and an output device. Examples of the input device of the second user interface 238 can include a keypad, a touchpad, softkeys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the electronic system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the electronic system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or combination thereof.

The second control unit 234 can include a second controller interface 244. The second controller interface 244 can be used for communication between the second control unit 234 and other functional units in the second device 106. The second controller interface 244 can also be used for communication that is external to the second device 106.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a microelectromechanical system (MEMS), optical circuitry, waveguides, wireless circuitry, wireline circuitry, or combination thereof.

A second storage unit 246 can store the second software 242. The second storage unit 246 can also store the such as data representing incoming images, data representing previously presented image, sound files, or combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the electronic system 100 is shown with the second storage unit 246 as a single hierarchy storage system, although it is understood that the electronic system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or an antenna, for interaction with the network 104.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The first communication unit 216 of the first device 102 can couple with the second device 106 to send information to the network 104 with the communication channel 108. The second device 106 can receive information in the second communication unit 236 from the second device transmission 210 of the network 104.

The second communication unit 236 can couple with the network 104 to send information to the first device 102 in the second device transmission 210. The first device 102 can receive information in the first communication unit 216 from the second device transmission 210 of the network 104. The electronic system 100 can be executed by the first control unit 212, the second control unit 234, or combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

For illustrative purposes, the electronic system 100 is described by operation of the first device 102 and the second device 106. It is understood that the first device 102 and the second device 106 can operate any of the modules and functions of the electronic system 100.

The modules described in this application can be implemented as instructions stored on a non-transitory computer readable medium to be executed by a first control unit 212, the second control unit 234, or combination thereof. The non-transitory computer medium can include the first storage unit 214, the second storage unit 246, or combination thereof.

The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

The modules described in this application can be part of the first software 226, the second software 242, or combination thereof. These modules can also be stored in the first storage unit 214, the second storage unit 246, or combination thereof. The first control unit 212, the second control unit 234, or combination thereof can execute these modules for operating the electronic system 100.

The modules described in this application can be hardware implementation, hardware circuitry, or hardware accelerators in the first control unit 212 or in the second control unit 234. The modules can also be hardware implementation, hardware circuitry, or hardware accelerators within the first device 102 or the second device 106 but outside of the first control unit 212 or the second control unit 234, respectively.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

Figure 3A:
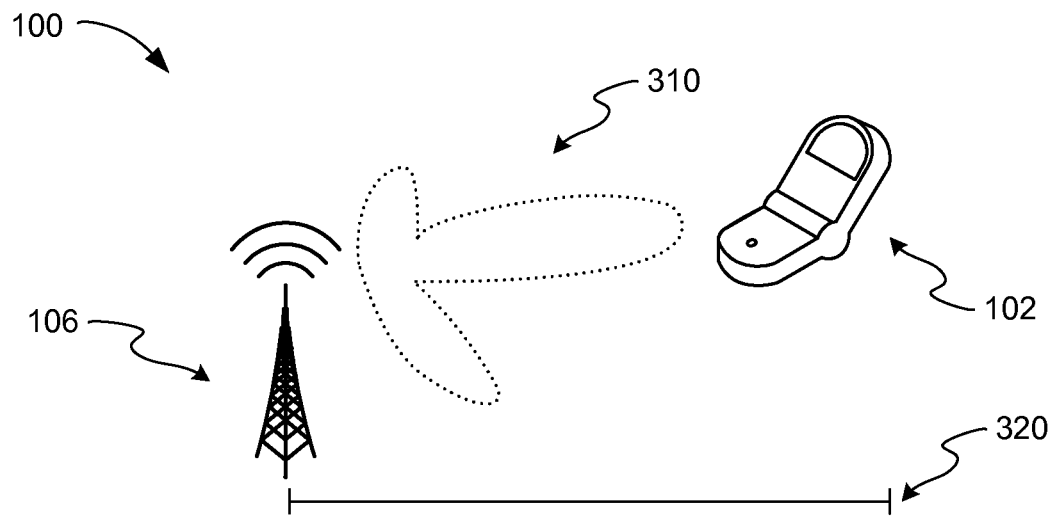
FIGS. 3A and 3B are examples of the first device and the second device of the electronic system in an embodiment of the invention.
Figure 3B:
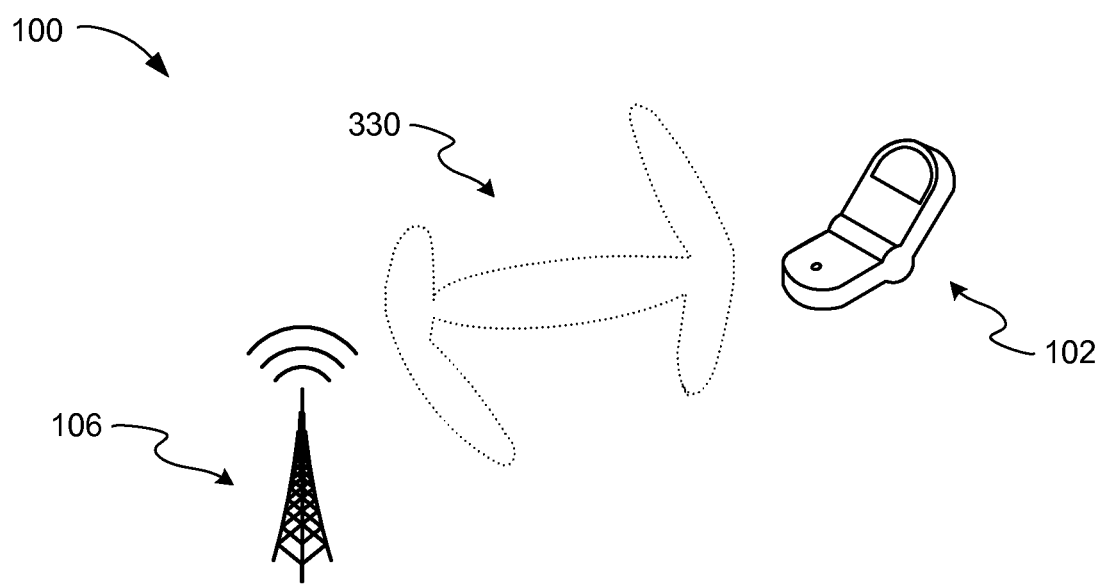

Referring now to FIGS. 3A and 3B, therein is shown examples of the first device 102 and the second device 106 of the electronic system 100 in embodiments of the invention. The electronic system 100 can also include a signal 310 such as received signal at the first device 102 from the second device 106. The signal 310 can include the communication channel 108 of FIG. 1, the first search channel 118 of FIG. 1, the second search channel 128 of FIG. 1, or combination thereof.

Given an effective area of a receive antenna such as the antenna in the first communication unit 216 of FIG. 1, a received signal power decreases with a square of a carrier frequency. Thus, given a transmission power, the received signal power of a signal in a 30 GHz band could be 100 times weaker than one in a 3 GHz band for a link range 320 such as a distance between a transmitter such as the second device 106, and a receiver such as the first device 102. The link range 320 can be increased with highly directional antenna transmissions.

In an embodiment of the invention, the coverage area of the transmit and receive antenna array 420 of a millimeter-wave based system can be less than twenty-five degrees (25°). A typical cellular base station (not shown) of current cellular systems, which can operate in frequency ranges below 30 GHz, can provide a coverage area approximately ninety-degrees (90°) to one-hundred twenty degrees (120°) per sector. For illustrative purposes the signal 310, the transmitted and received signal 330, or combination thereof, are shown representing a width less than twenty-five degrees (25°) although it is understood that the width may be different. The transmitted and received signal 330 can include the communication channel 108 of FIG. 1, the first search channel 118 of FIG. 1, the second search channel 128 of FIG. 1, or combination thereof.

For example, in an embodiment of the invention, the second device 106 transmits the signal 310 with energy directed toward the first device 102 as a desired receiver for obtaining a longer range for the signal 310. Further for example, at the same time, the first device 102 directs its antenna array towards the second device 106 as a desired transmitter for obtaining a longer range for the signal 310. For illustrative purposes, the second device 106 is shown transmitting the signal 310 with energy directed toward the first device 102 although it is understood that any number of transmitters, such as the second device 106, the third device 116 of FIG. 1, the fourth device 126 of FIG. 1, or combination thereof, and any direction may be used. If possible such as if the second device 106 can maintain communication with a smaller number of RF chains, the first device 102 can create multiple beams with its antenna array to "listen" for signals coming from two or more devices such as the third device 116, the fourth device 126, or combination thereof, in space at a same time.

It has been discovered that the electronic system 100 with the first device 102, the second device 106, the third device 116, the fourth device 126, or combination thereof, can provide a longer range for the signal 310. The electronic system 100 can provide highly directional antenna transmissions for longer ranges.

Figure 4:
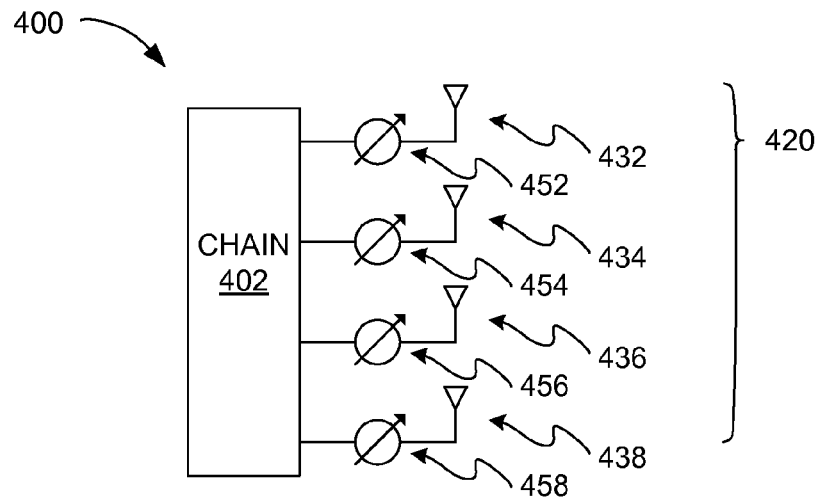
FIG. 4 is an example of a signal chain of the electronic system in an embodiment of the invention.

Referring now to FIG. 4, therein is shown an example of a signal chain of the electronic system in an embodiment of the invention. The signal chain such a radio frequency (RF) chain can preferably be implemented with hardware, gates, circuitry, integrated circuit, integrated circuit cores, or combination thereof. For millimeter-wave systems, an antenna array 400, such as a highly directional antenna array including the signal chain and antennas, can preferably be included in the first device 102, the second device 106, or combination thereof.

Due to high cost of signal chain hardware such as radio frequency (RF) chains particularly millimeter-wave RF chains, the antenna array 400, such as a phased array, offers a cost-efficient implementation of an antenna array. In the antenna array 400, a signal chain 402, such as a radio frequency (RF) chain, can drive more than one antenna element. The antenna array 420 can provide or form the communication channel 108 of FIG. 1, the first search channel 118 of FIG. 1, the second search channel 128 of FIG. 1, or combination thereof. Large antenna arrays are feasible for millimeter-wave systems because a length of a millimeter-wave antenna is can be on the order of a few millimeters. For illustrative purposes, the antenna array 400 is shown with four antennas although it is understood that any number of antennas may be used.

The antenna array 400 can determine a shape and direction of a radiation pattern based on relative phases of radio frequency (RF) signals, such as the signal 310 of FIG. 3, the transmitted and received signal 330 of FIG. 3, or combination thereof, for each antenna. The shape and direction of the radiation pattern can be changed electronically "on the fly" by changing phase shifts, described in more detail below.

The antenna array 400 including the signal chain 402 can provide one of the RF signal, such as the signal 310 of FIG. 3, the transmitted and received signal 330 of FIG. 3, or combination thereof, for a first element 432 such as a first antenna of the antenna array 420. The antenna array 400 including the signal chain 402 can provide a second of the RF signal for a second element 434 such as a second antenna of the antenna array 420. The antenna array 400 including the signal chain 402 can provide a third of the RF signal for a third element 436 such as a third antenna of the antenna array 420. The antenna array 400 including the signal chain 402 can provide a fourth of the RF signal for a fourth element 438 such as a fourth antenna of the antenna array 420. The one of the RF signal, the second of the RF signal, the third of the RF signal, the fourth of the RF signal, or combination thereof, can be the same or different.

A first component 452, such as a first phase shifter of the antenna array 420 such as a phase array, can apply a pre-defined phase shift, such as ten degrees, thirty degrees, or any phase shift, to a signal of the signal chain 402 before it is transmitted by a given antenna such as the first element 432. Thus, a "total" transmitted signal, such as a sum of signals transmitted by all antennas, is a sum of multiple copies of a same signal generated by an RF chain, such as the signal chain 402, with different phase shifts. It can be shown mathematically that such a procedure can focus a transmitted signal to a given direction.

Similarly, a second component 454, such as a second phase shifter of the antenna array 420, can apply a pre-defined phase shift to a signal of the signal chain 402 before it is transmitted by a given antenna such as the second element 434. Further, a third component 456, such as a third phase shifter of the antenna array 420, can apply a pre-defined phase shift to a signal of the signal chain 402 before it is transmitted by a given antenna such as the third element 436. Yet further, a fourth component 458, such as a fourth phase shifter of the antenna array 420, can apply a pre-defined phase shift to a signal of the signal chain 402 before it is transmitted by a given antenna such as the fourth element 438.

The first component 452, the second component 454, the third component 456, the fourth component 458, or combination thereof, can also apply a pre-defined phase shift to a signal from the first element 432, the second element 434, the third element 436, the fourth element 438, or combination thereof. For example, a different phase shift can be applied to one or more of the first element 432, the second element 434, the third element 436, or the fourth element 438, to emphasize or suppress a signal from a given direction. The antenna array 400 can be implemented as a phased array based on changing a phase of signals transmitted, received, or combination thereof, by different antennas.

The signal chain 402, such as the RF chain, can preferably be implemented as hardware, such as physical circuitry including semiconductor logic. The physical circuitry can be in the form of a physical device such as a semiconductor chip or a semiconductor block.

It has been discovered that the antenna array 400 can change shape and direction of a radiation pattern by changing phase shifts "on the fly". The antenna array 400 including the signal chain 402 provides an RF signal for the first component 452, the second component 454, the third component 456, the fourth component 458, or combination thereof.

Figure 5:
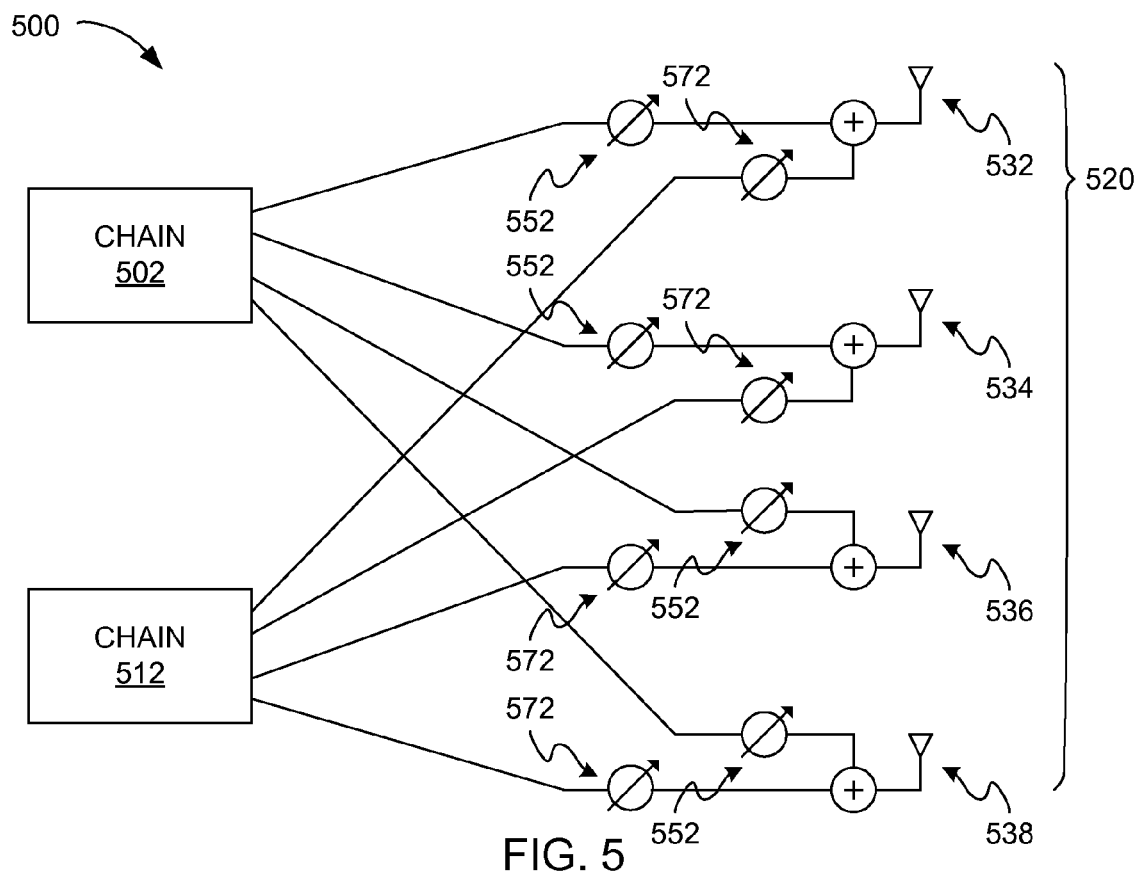
FIG. 5 is a phased array in an embodiment of the invention.

Referring now to FIG. 5, therein is shown a phased array 500 in an embodiment of the invention. For illustrative purposes, the phased array 500 is shown with two signal chains although it is understood that any number of signal chains may be used. The signal chains such a radio frequency (RF) chains can preferably be implemented with hardware, gates, circuitry, integrated circuit, integrated circuit cores, or combination thereof. The transmitted and received signal 330 of FIG. 3 can be highly directional with the phased array 500 with multiple signal chains including signal chains and antennas. The phased array 500 can include more than one of the signal chains, each operating more than one antenna. For example, two of the signal chains can operate four antennas such as a four-element phased array.

Most modern electronic communication systems, such as conventional cellular systems, do not use highly direction antennas. For example, a coverage area of a sector of a conventional cellular system can be approximately ninety to one-hundred twenty degrees (90°-120°). In contrast, the coverage area of a millimeter-wave based electronic system can be less than twenty-five degrees (25°) or ten degrees to twenty-five degrees (10°-25°) requiring frequent tracking of positions including corresponding transmitters and receivers for optimal orientation of directional components such as antennas. The optimal orientation can be defined as a position in which the received signal power, the signal-to-interference-plus-noise ratio, or combination thereof, is maximized.

Determining the optimal orientation or position can include beamforming training for communication devices including radios such as the first device 102 of FIG. 1, the second device 106 of FIG. 1, the third device 116 of FIG. 1, the fourth device 126 of FIG. 1, or combination thereof. The beamforming training can include a search for determining direction and signal strength including beamforming training signals. Beamforming can be defined as a signal processing technique for controlling a directionality of transmission or reception of a signal, such as a beam.

Two or more of the communication devices can periodically train or re-train beams. In a phased array, such as the antenna array 400, the multiple chain phased array 500, or combination thereof, training or re-training the beams includes values for phase rotation for an element or antenna. The re-training can reflect changes in environment, movement of a transmitter, movement of a receiver, or combination thereof.

One of the communication devices can also cease connection with another of the communication devices and establish connection with yet another of the communication devices. This re-connection can be challenging in cellular systems particularly with millimeter-wave systems. For example, a user equipment, such as the first device 102, moves away from a current serving station, such as the second device 106, and attempts to connect with another serving station, such as the third device 116. In a millimeter-wave system, highly directional antennas with short range and smaller or narrower coverage area significantly increase complexity of a handover process for the user equipment with the serving station and another serving station.

Preferably, the one of the communication devices, such as the user equipment or first device 102, can continuously search for another serving station, such as the third device 116, while exchanging data with a current serving station, such as the second device 106. It would also be preferable to continuously search for an alternate point of access to the network.

In an embodiment of the invention, a first signal chain 502, such as a first radio frequency (RF) chain, can provide beamforming training, transmitting data, receiving data, or combination thereof, such as the communication channel 108 of FIG. 1.

In another embodiment of the invention, a second signal chain 512, such as a second radio frequency (RF) chain, can provide a search such as continuously search for another of the serving stations, such as the first search channel 118 of FIG. 1, the second search channel 128 of FIG. 1, or combination thereof. Another of a radio frequency chain, such as the first signal chain 502, can provide beamforming training, transmitting data, receiving data, or combination thereof. Alternatively, the second signal chain 512 can provide a search and the first signal chain 502 can provide beamforming training, transmitting data, receiving data, or combination thereof.

The first signal chain 502, the second signal chain 512, or combination thereof, can provide one of the RF signal, such as the signal 310 of FIG. 3, the transmitted and received signal 330 of FIG. 3, or combination thereof, for an antenna array 520 including a first element 532 such as a first antenna. The signal chain 402 can provide a second of the RF signal for a second element 534 such as a second antenna of the antenna array 520. The signal chain 502 can provide a third of the RF signal for a third element 536 such as a third antenna of the antenna array 520. The radio frequency chain 502 can provide a fourth of the RF signal for a fourth element 538 such as a fourth antenna of the antenna array 520.

The one of the RF signal, the second of the RF signal, the third of the RF signal, the fourth of the RF signal, or combination thereof, can be the same or different. The antenna array 520 can provide or form the one of the RF signal, the second of the RF signal, the third of the RF signal, the fourth of the RF signal, or combination thereof, such as the communication channel 108, the first search channel 118, the second search channel 128, or combination thereof.

First components 552, such as first phase shifters, can apply pre-defined shifts, such as ten degrees, thirty degrees, or any phase shift, to a signal transmitted or received by the first signal chain 502. Similarly, second components 572, such as second phase shifters, can apply pre-defined shifts to a signal transmitted or received by the second signal chain 512. The first components 552, the second components 572, or combination thereof, can process signals transmitted or received by the first element 532, the second element 534, the third element 536, the fourth element 538, or combination thereof.

For illustrative purposes, the phased array 500 is shown with two radio frequency chains and four antennas although it is understood that any number of the radio frequency chains or antennas may be used. For cost savings, a number of RF chains can be less than a number of antennas in practical implementation of millimeter-wave electronic systems.

The first signal chain 502, the second signal chain 512, or combination thereof, can preferably be implemented as hardware, such as physical circuitry including semiconductor logic. The physical circuitry can be in the form of a physical device such as a semiconductor chip or semiconductor block.

It has been discovered that the electronic system 100 with the phased array 500 provides a good tradeoff with complexity, cost, performance, or combination thereof. The phased array 500 includes multiple antennas with a smaller number of the RF chain.

It has also been discovered that the electronic system 100 with the phased array 500 can generate multiple beams with the same array of the antennas. The position of each beam can be independently or individually controlled electronically such as for training or re-training.

It has further been discovered that the small size of each of the first element 432, the second element 434, the third element 436, and the fourth element 238, large antenna arrays can be implemented. Large antenna arrays can improve signal gain particularly with less signal chains such as RF chains.

Figure 6:
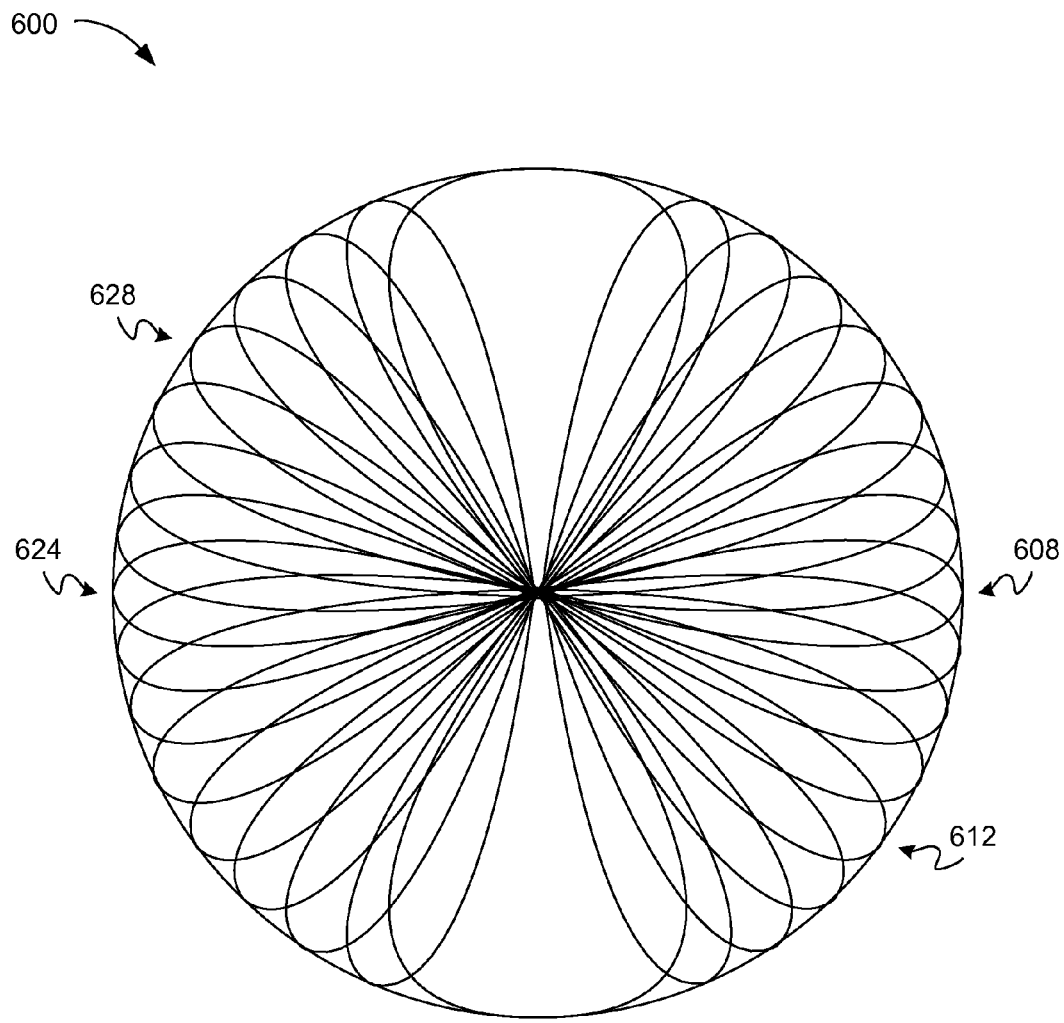
FIG. 6 is an example of a beam pattern of the electronic system in an embodiment of the invention.

Referring now to FIG. 6, therein is shown an example of a beam pattern 600 of the electronic system 100 in an embodiment of the invention. The beam pattern 600 can be implemented with a few signal chains, such as a radio frequency (RF) chain, and a large antenna array to enable a continuous search of communication devices such as other base stations for supporting handover. The beam pattern 600 can include the communication channel 108 of FIG. 1, the first search channel 118 of FIG. 1, the second search channel 128 of FIG. 1, or combination thereof. Similarly, the communication channel 108, the first search channel 118, the second search channel 128, or combination thereof, can form a portion of the beam pattern 600.

The few signal chains, such as a radio frequency (RF) chain can include the signal chain 402, the first signal chain 502, the second signal chain 512, or combination thereof. The large antenna array can include the first element 432, the second element 434, the third element 436, the fourth element 438, the first element 532, the second element 534, the third element 536, the fourth element 538, or combination thereof.

The beam pattern 600 can include beams pointed in any direction such as a beam eight (B8) 608, a beam twelve (B12) 612, a beam twenty-four (B24) 624, a beam twenty-eight (B28) 628, or combination thereof. The beam pattern 600 can also include beams such as the communication channel 108 such as a signal, a beam, or combination thereof, the first search channel 118 such as a signal, a beam, or combination thereof, the second search channel 128 such as a signal, a beam, or combination thereof, or combination thereof.

For illustrative purposes, the beam pattern 600 is shown with thirty-two beams although it is understood that any number of the beams may be used. Also for illustrative purposes, the beam pattern 600 is shown with beams in thirty-two directions although it is understood that any number or orientation of the directions may be used. Further for illustrative purposes, the beam pattern 600 is shown with thirty-two beams although it is understood that one or more beams may be redirected or repositioned any number of times to form the beam pattern 600.

It has been discovered that the electronic system 100 can include the beam pattern 600 with one or more beams redirected or repositioned any number of times. The beam pattern 600 can include beams of any number, orientation, direction, or combination thereof, and can periodically transmit signals in all possible directions such that two or more beams may be provided by a same signal chain by using two or more RF chains at different times, orientation, direction, or combination thereof.

Figure 7:
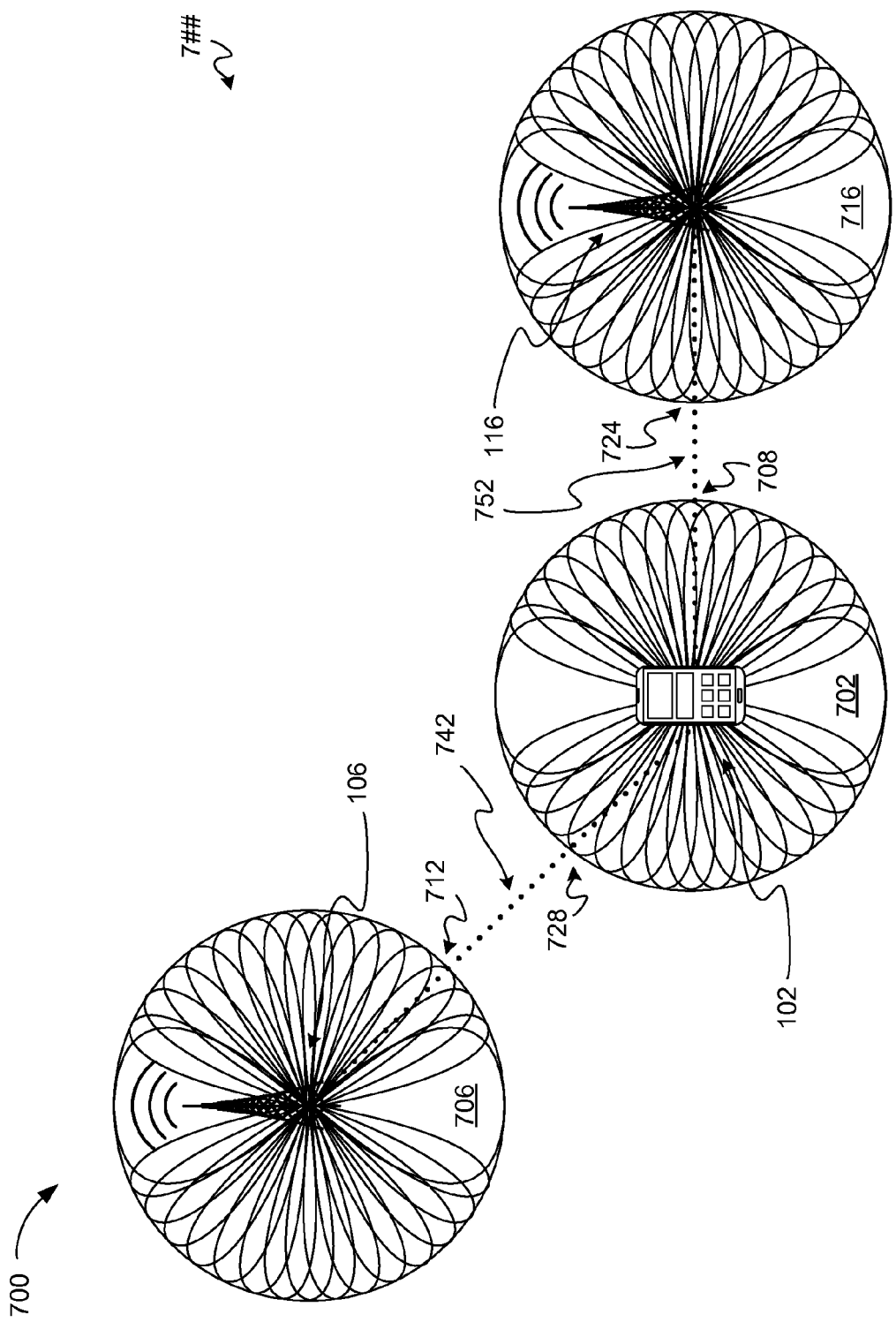
FIG. 7 is an example of beam patterns with the first device, the second device, and the third device of the electronic system in an embodiment of the invention.

Referring now to FIG. 7, therein is shown an example of beam patterns 700 of the electronic system 100 in an embodiment of the invention. The electronic system 100 can include a handover process maintaining a connection while searching for other base stations. The handover process during a search can require that a beam, such as the communication channel 108 of FIG. 1, of a device, such as the first device 102, can be directed towards another beam, such as the first search channel 118 of FIG. 1, the second search channel 128 of FIG. 1, or combination thereof, of another device, such as the second device 106, the third device 116, or combination thereof. Thus, electronic system 100 can include multiple beams such as a focused communication beam and a rotating search beam.

Increasing the link range 320 of FIG. 3 can include highly directional transmissions. The devices can require alignment with the beams directed towards one another due to the highly directional antenna transmissions. Both communication and beamforming, including beamforming training, can require the alignment particularly for reliable and fast detection, transmission, or combination thereof. The beam patterns 700 can include the communication channel 108, the first search channel 118, the second search channel 128, or combination thereof. Similarly, the communication channel 108, the first search channel 118, the second search channel 128, or combination thereof, can form a portion of the beam patterns 700.

In an embodiment of the invention, the beam patterns 700 can include a first beam pattern 702 of the first device 102 with a beam twelve (B8) 708, a second beam pattern 706 of the second device 106 with a beam twelve (B12) 712, and a third beam pattern 716 of the third device 116. The first device 102 with the first beam pattern 702 can communicate with the second device 106 with the second beam pattern 706, the third device 116 with the third beam pattern 716, or combination thereof.

The first beam pattern 702, such as a user equipment beam pattern, can include beams pointed in any direction. For illustrative purposes, the first beam pattern 702 is shown with beams in thirty-two directions although it is understood that any number or orientation of beams can be used, and one or more beams may be redirected or repositioned any number of times to form the first beam pattern 702.

The second beam pattern 706, such as a base station beam pattern, can include beams pointed in any direction. For illustrative purposes, the second beam pattern 706 is shown with beams in thirty-two directions although it is understood that any number or orientation of beams can be used, and one or more beams may be redirected or repositioned any number of times to form the second beam pattern 706.

The third beam pattern 716, such as another base station beam pattern, can include beams pointed in any direction. For illustrative purposes, the third beam pattern 716 is shown with beams in thirty-two directions although it is understood that any number or orientation of beams can be used, and one or more beams may be redirected or repositioned any number of times to form the third beam pattern 716.

In an embodiment, the first device 102 with the first beam pattern 702, including the beam eight (B8) 708, can search for another base station, such as the third device 116 with the third beam pattern 716, including a beam twenty-four (B24) 724. The first device 102 with the first beam 702 including the beam twenty-eight (B28) 728, can simultaneously or in parallel maintain a first connection 742, such as the communication channel 108 of FIG. 1, a signal, a beam, or combination thereof, with the second device 106 with the second beam pattern 706 including the beam twelve (B12) 712.

For example, the first device 102, with the beam twenty-eight (B28) 728 of a signal chain such as the first signal chain 502 of FIG. 5, maintains the first connection 742 with the second device 106. The first device 102, with the beam eight (B8) 708 of another signal chain such as the second signal chain 512 of FIG. 5, can implement a training signal such as the beam eight (B8) 708, of a second connection 752 such as the first search channel 118 of FIG. 1.

Further to the example, training can occur with the third device 116 providing another training signal such as the beam twenty-four (B24) 724, of the second connection 752, and having the beam eight (B8) 708 of the first device 102 pointing to the beam twenty-four (B24) of the third beam pattern 716. The training signal and the another training signal can be based on a search mode for transmitting, receiving, or combination thereof, beamforming training signals. Sufficient time for the search, the beamforming, the training, or combination thereof, can be required with the beam eight (B8) 708 of the first device 102 pointing to the beam twenty-four (B24) of the third beam pattern 716.

For illustrative purposes, the electronic system 100 is shown with the beam eight (B8) 708 of the first device 102, the beam twelve (B12) 712 of the second device 106, the beam twenty-four (B24) 724 of the third device 116, and the beam twenty-eight (B28) 728 of the first device 102, although it is understood that any number of beams may be provided by the first device 102, the second device 106, and the third device 116.

It has been discovered that the electronic system 100 with the beam patterns 700 can provide a handover process including communication with the first device 102 and the second device 106 simultaneously or in parallel with a search for another device such as the third device 116. The beams such as the first connection 742, the second connection 752, other connections, or combination thereof, can be implemented simultaneously or in parallel with multiple signal chains such as the first signal chain 502, the second signal chain 512, other signal chains, or combination thereof.

Figure 8:
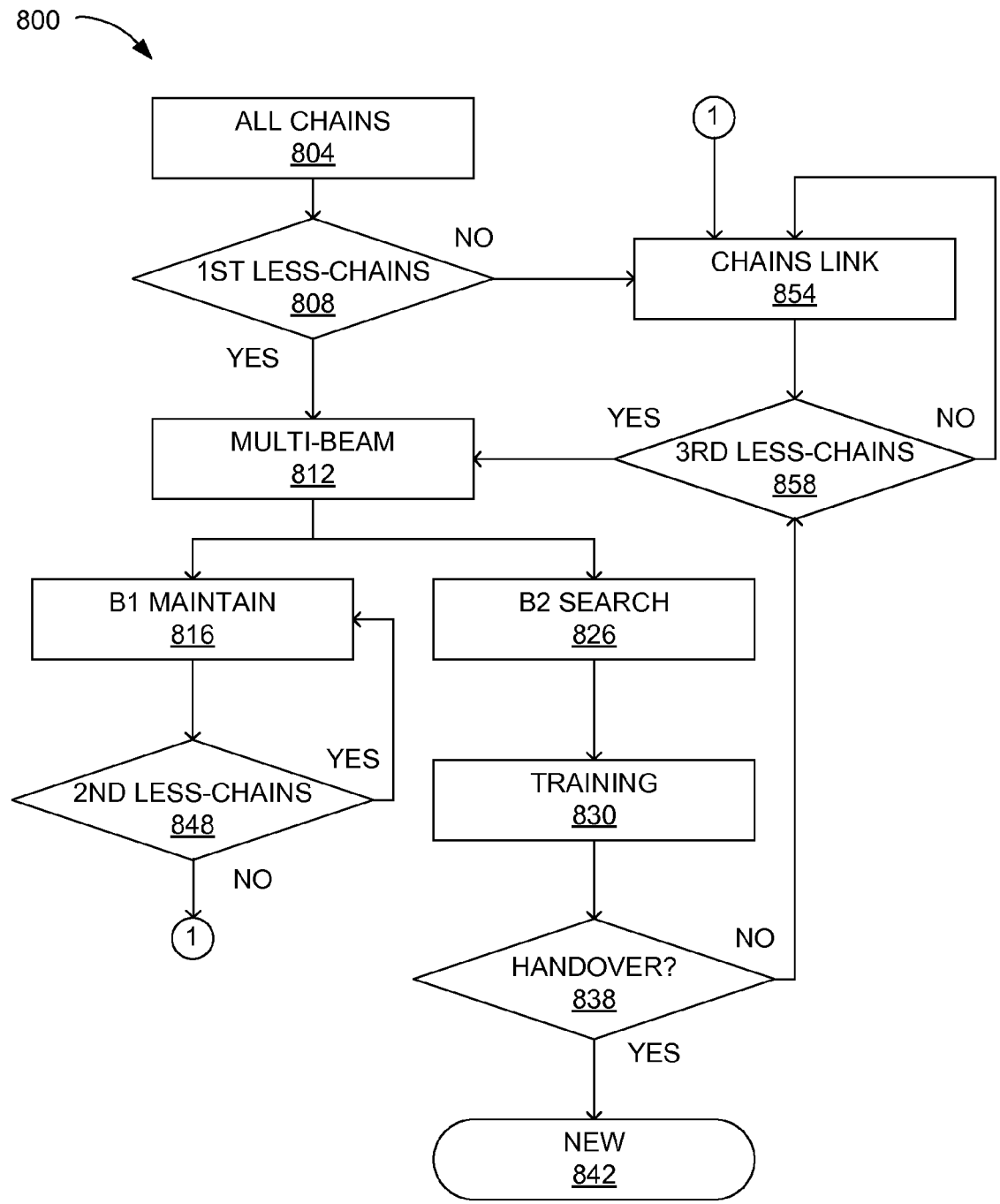
FIG. 8 is a control flow of the electronic system in an embodiment of the invention.

Referring now to FIG. 8, therein is shown a control flow 800 of the electronic system 100 in an embodiment of the invention. The control flow 800 of the electronic system 100 can be implemented with a terminal such as user equipment, the first device 102, or combination thereof. The electronic system 100 can periodically provide beamforming acquisition and training signals in all directions.

The terminal can provide reliable and fast detection of signals for maintaining current network connections, such as base stations, with updated beamforming based on changes in environment, movement, or combination thereof. The terminal can also identify other network connections, such as other base stations, within a predetermined proximity for determining potential network connections, such as potential base stations, for a handover process.

The terminal can further compare, measure, or combination thereof, signal strengths for determining implementation of a handover. Preferably, the terminal can implement two or more beams with two or more signal chains such as radio frequency (RF) chains for communication and search simultaneously or in parallel.

In a base process 804, the terminal, such as the first device 102 of FIG. 1, can implement all signal chains, such as the first signal chain 502, the second signal chain 512, or combination thereof, for communication or data transmission with a base station, such as the second device 106 of FIG. 1. The terminal can preferably include two or more signal chains in the base process 804.

In a first less-chains process 808, the terminal determines if a link, such as the communication channel 108 of FIG. 1, can be maintained with a smaller number of the signal chains. The link can preferably provide the communication or data transmission with less than the two or more signal chains in the first less-chains decision process 808. The first device 102 can include the first control unit 212 of FIG. 2 that can be configured to determine if the link, such as the communication channel 108, can be maintained with a smaller number of the signal chains.

In a multi-beam process 812, the terminal can provide the communication or data transmission with less than the two or more signal chains. One or more of the signal chains can form a first beam, such as the communication channel 108 of FIG. 1, and another one or more of the signal chains can form a second beam, such as the first search channel 118 of FIG. 1, in the multi-beam process 812.

In a maintenance process 816, such as a beam-one (B1) process, the terminal maintains "data transmission mode" (transmission and reception of data, control, and reference signals with the serving base station). The one or more of the signal chains forming the first beam can maintain data transmission in the beam-one (B1) process 816.

In a search process 826, such as a beam-two (B2) process, the terminal implements "search mode" (transmission and reception of beamforming acquisition and training signals in order to search for other potential base stations). The another one or more signal chains forming the second beam can search for other base stations in the beam-two (B2) search process 826. The search process 826 is can preferably be performed simultaneous or in parallel to the maintenance process 816.

In a training process 830, such as a beamforming training process, the terminal acquires a signal and trains or controls a direction of transmission or reception of the signal such as a beam. The second beam transmits or receives signals to or from other base stations in the training process 830.

In a handover process 838, the terminal determines whether a handover should be performed or implemented based on the first beam, the second beam, other beams, or combination thereof. The terminal can compare, measure, or combination thereof, signal strengths of the first beam, the second beam, other beams, or combination thereof, for determining the handover.

In a new communication channel process 842, the terminal can provide communication, such as transmit data, receive data, or combination thereof, with another of the base stations such as the second device 106, the third device 116, or combination thereof. The terminal can communicate with a new serving base station with the one or more of the signal chains forming the first beam.

In a second less-chains process 848, the terminal determines if the maintenance process 816 can be maintained with a smaller number of the signal chains. The terminal can continue the maintenance process 816 based on the link maintained by the smaller number of the signal chains.

In a chains link process 854, all of the signal chains are required to maintain the link. The link with the terminal and the base station is implemented with all signal chains and a search is performed when all signal chains are in "search mode" typically sequential with "data transmission mode".

In a third less-chains process 858, the terminal determines if the link can be maintained with a smaller number of the signal chains. The terminal can implement the multi-beam process 812 based on the link providing the communication or data transmission with less than the two or more signal chains. Alternatively, the terminal can implement the handover process 838 based on the terminal determining that the link requires all signal chains.

For illustrative purposes, the control flow 800 is shown with two beams based on two signal chains although it is understood that any number of beams, any number of signal chains, or combination thereof, may be used. The number of beams can be determined by the link performing communication or "data transmission mode" such as by the first less-chains process 808, the second less-chains process 848, the third less-chains process 858, or combination thereof.

It has been discovered that the electronic system 100 includes both the "data transmission mode" and the "search mode" performed in parallel. Performing the "data transmission mode" (transmission and reception of data, control, and reference signals with the serving base station) and the "search mode" (transmission and reception of beamforming acquisition and training signals in order to search for other potential base stations) simultaneously or in parallel reduces latency and increases reliability.

Figure 9:
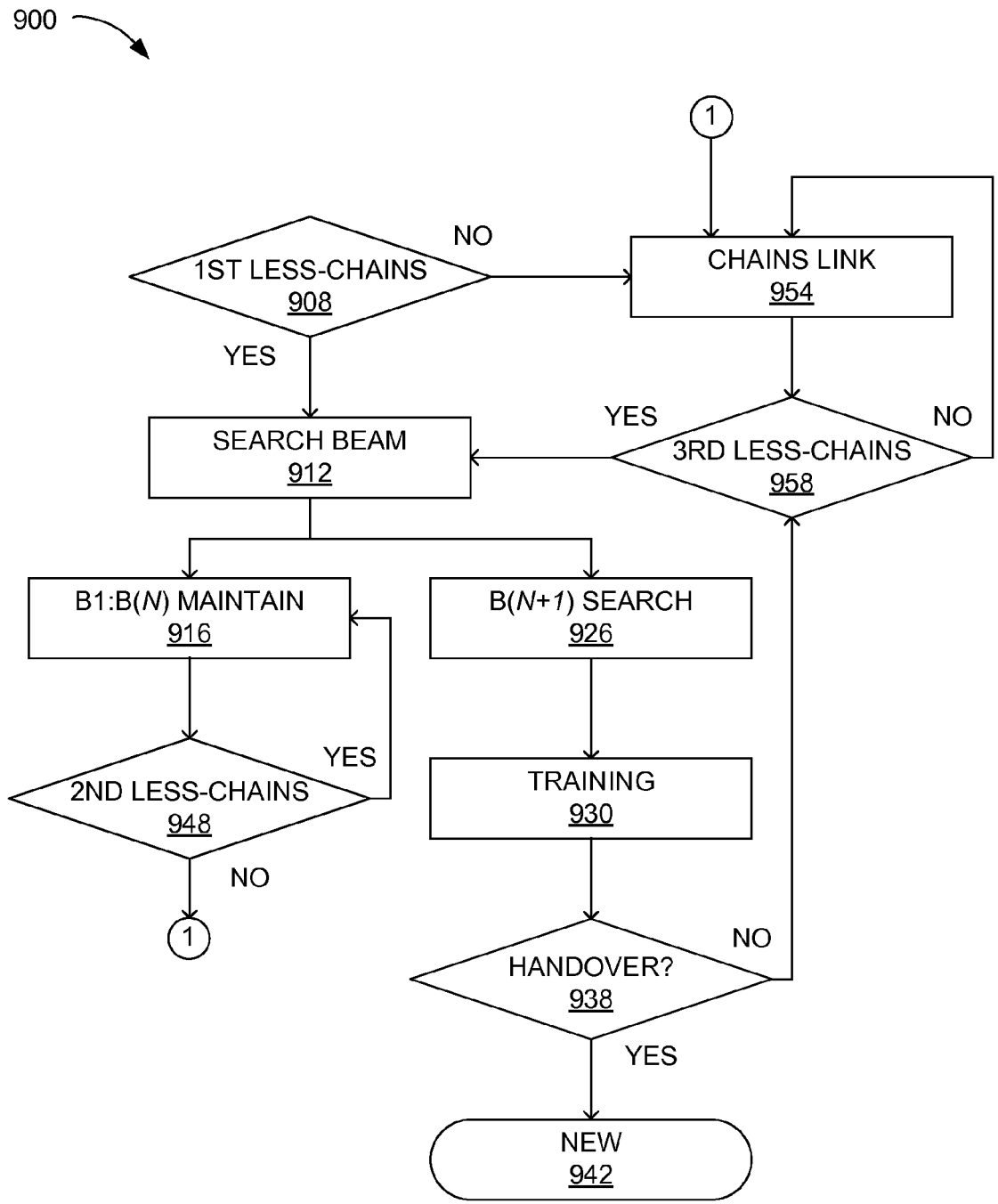
FIG. 9 is a control flow of the electronic system in an embodiment of the invention.

Referring now to FIG. 9, therein is shown a control flow 900 of the electronic system 100 in an embodiment of the invention. The control flow 900 can be implemented with a base station such as a serving base station, the second device 106 of FIG. 1, a potential base station, the third device 116 of FIG. 1, or combination thereof. The base station can include two or more beams with two or more signal chains such as radio frequency (RF) chains for communication and search simultaneously or in parallel.

In an embodiment of the invention, the base station can simultaneously communicate with one or more terminals, such as the first device 102 of FIG. 1. The base station can produce a number of signal patterns with multiple beams for a same number of supported terminals such as supported users. For example, base station can include a number of the signal chains, such as equal to a maximum number of supported terminals.

In an embodiment of the invention, the base station can provide more than two beams including two or more search beams. Thus, a probability of success increases for a neighbor discovery process, such as a search of other potential serving stations allowing in-range devices to detect each other establishing links to form a connected network, as well as improving latency and reliability for a handover process.

In a first less-chains process 908, the base station determines if a link, such as the first communication channel 108 of FIG. 1, can be maintained with a smaller number of the signal chains. The link can preferably provide the communication or data transmission with less than the two or more signal chains in the first less-chains process 908. The second device 106 can include the second control unit 234 of FIG. 2 that can be configured to determine if the link, such as the communication channel 108, can be maintained with a smaller number of the signal chains.

In a search beam process 912, the base station can provide a search beam. The search beam process 912 can provide the search beam based on the first less-chains process 908 determining that the base station can support all current terminals without all signal chains. One or more of the signal chains can form first beams, such as the communication channel 108 of FIG. 1, and another one or more of the signal chains can form second beams, such as the first search channel 118 of FIG. 1, the second search channel 128 of FIG. 1, or combination thereof, in the search beam process 912.

In a maintenance process 916, such as a beam-one to beam-N (B1:B(N)) process, the base station maintains "data transmission mode" (transmission and reception of data, control, and reference signals with the terminals) for all N terminals or users. The one or more of the signal chains for the "data transmission mode" can maintain data transmission for all terminals in the maintenance process 916.

In a search process 926, such as a beam-(N+1) (B(N+1)) process, the base station implements "search mode" (transmission and reception of beamforming acquisition and training signals in order to search for other potential base stations). The another one or more signal chains forming the second beam can search for other terminals, such as neighbor discovery, in the search process 926. The search process 926 can preferably be performed simultaneous or in parallel to the maintenance process 916.

In a training process 930, such as a beamforming training process, the base station acquires or transmits a signal and trains or controls a direction of transmission or reception of the signal such as a beam. The second beam transmits or receives signals to or from other terminals in the training process 930.

In a handover process 938, the base station determines whether a handover should be performed or implemented based on the first beam, the second beam, other beams, or combination thereof. The base station can compare, measure, or combination thereof, signal strengths of the terminals for determining the handover.

In a new communication channel process 942, the base station can provide communication, such as transmit data, receive data, or combination thereof, with another of the terminals such as the first device 102, another of the first device 102, other terminals, or combination thereof. The base station can communicate with a new terminal with the one or more of the signal chains forming the first beam.

In a second less-chains process 948, the base station determines if the maintenance process 916 can be maintained with a smaller number of the signal chains. The base station can continue the maintenance process 816 based on supporting all terminals or users by the smaller number of the signal chains.

In a chains link process 954, all of the signal chains are required to support all terminals or users. The links with the terminals and the base station are implemented with all signal chains and a search is performed when all signal chains are in "search mode" typically sequential with "data transmission mode".

In a third less-chains process 958, the base station determines if all the terminals or users can be supported with a smaller number of the signal chains. The base station can implement the search beam process 912 based on supporting all the terminals or users with less than the two or more signal chains. Alternatively, the base station can implement the handover process 938 based on the base station determining that all of the signal chains are required to support all terminals or users.

For illustrative purposes, the control flow 900 is shown with two beams based on two signal chains although it is understood that any number of beams, any number of signal chains, or combination thereof, may be used. The number of beams can be determined by the base station supporting all terminals or users such as by the first less-chains process 908, the second less-chains process 948, the third less-chains process 958, or combination thereof.

It has been discovered that the electronic system 100 includes both the "data transmission mode" and the "search mode" performed in parallel. Performing the "data transmission mode" (transmission and reception of data, control, and reference signals with the serving base station) and the "search mode" (transmission and reception of beamforming acquisition and training signals in order to search for other potential base stations) simultaneously or in parallel reduces latency and increases reliability.

Figure 10:
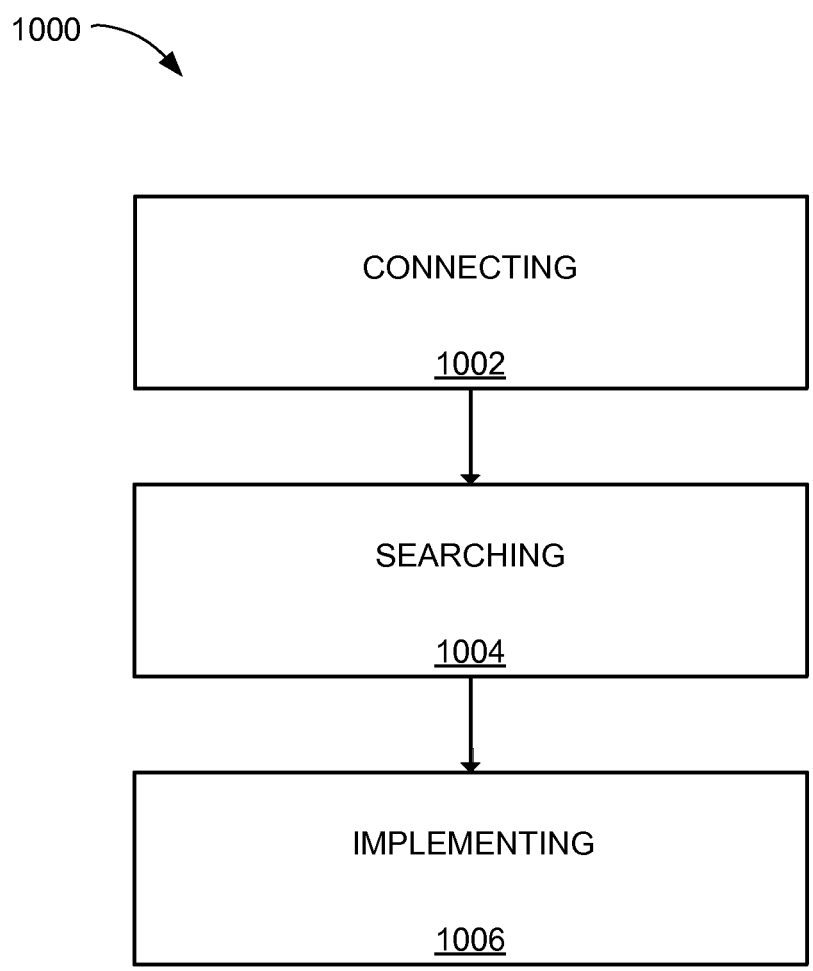
FIG. 10 is a flow chart of a method of operation of an electronic system in an embodiment of the invention.

Referring now to FIG. 10, therein is shown a flow chart of a method 1000 of operation of an electronic system 100 in an embodiment of the invention. The method 1000 includes: connecting a first device to a communication channel configured to connect to a second device in a block 1002; searching with a search channel configured to search for a third device in parallel to the communication channel connected to the first device and the second device in a block 1004; and implementing a handover process with a communication unit configured to handover the communication channel to connect the first device and the third device without the second device in a block 1006.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the invention is that it valuably supports and services the historical trend of reducing costs, simplifying systems, and increasing performance.

These and other valuable aspects of an embodiment of the invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
an antenna array configured to:
form a communication channel between a first device and a second device using a plurality of signal chains,
form a search channel using a first subset of the plurality of signal chains while simultaneously maintaining the communication channel between the first device and the second device with a second subset of the plurality of signal chains,
wherein the first subset of the plurality of signal chains continuously rotates the search channel in any direction for a third device, and
wherein a number of chains within each of the first subset and the second subset is dynamically configured based on maintaining the communication channel between the first device and the second device using the second subset; and
a communication unit configured to handover the communication channel to connect the first device and the third device without the second device.

2. The system as claimed in claim 1 wherein the first device includes the antenna array.

3. The system as claimed in claim 1 wherein the antenna array configured to provide the communication channel forms a portion of a beam pattern.

4. The system as claimed in claim 1 wherein the antenna array configured to provide the search channel forms a portion of a beam pattern.

5. The system as claimed in claim 1 further comprising a phased array providing the communication channel.

6. The system as claimed in claim 1 further comprising a control unit, coupled to the communication unit, for determining that the communication channel can be maintained with a smaller number of signal chains.

7. The system as claimed in claim 1 further comprising a signal chain providing the communication channel.

8. The system as claimed in claim 1 further comprising a signal chain providing the search channel.

9. The system as claimed in claim 1 wherein the antenna array configured to provide the communication channel configured to connect the first device to the second device includes the communication channel configured to connect a beam of the first device to a beam of the second device.

10. The system as claimed in claim 1 wherein the communication unit configured to connect the first device and the third device includes the communication unit configured to connect a beam of the first device to a beam of the third device.

11. A method of operation of an electronic system comprising:
forming a communication channel between a first device and a second device along with a search channel using a plurality of signal chains of an antenna array, wherein:
the search channel is formed using a first subset of the plurality of signal chains while simultaneously maintaining the communication channel between the first device and the second device with a second subset of the plurality of signal chains,
wherein the first subset of the plurality of signal chains continuously rotates the search channel in any direction for a third device, and
wherein a number of chains within each of the first subset and the second subset is dynamically configured based on maintaining the communication channel between the first device and the second device using the second subset; and
implementing a handover process with a communication unit configured to handover the communication channel to connect the first device and the third device without the second device.

12. The method as claimed in claim 11 wherein connecting the first device includes connecting the first device including the antenna array.

13. The method as claimed in claim 11 wherein connecting the first device to the communication channel includes connecting the first device to a beam pattern including the communication channel.

14. The method as claimed in claim 11 wherein searching with the search channel includes searching with a beam pattern including the search channel.

15. The method as claimed in claim 11 wherein connecting the first device to the communication channel includes wherein connecting the first device to the communication channel provided by a phased array.

16. The method as claimed in claim 11 further comprising determining, with a control unit, that the communication channel can be maintained with a smaller number of signal chains.

17. The method as claimed in claim 11 wherein connecting the first device to the communication channel includes connecting the first device to the communication channel provided by a signal chain.

18. The method as claimed in claim 11 wherein searching with the search channel includes searching with the search channel provided by a signal chain.

19. The method as claimed in claim 11 wherein connecting the first device to the communication channel includes connecting the first device to the communication channel configured to connect a beam of the first device to a beam of the second device.

20. The method as claimed in claim 11 wherein implementing the handover process with the communication unit includes implementing the handover process with the communication unit configured to connect a beam of the first device to a beam of the third device.

* * * * *